Patented Jan. 5, 1943

2,307,326

UNITED STATES PATENT OFFICE 2,307,326

ART OF TREATING SUCROSE-BEARING LIQUIDS

Adolph W. Lissauer, Louisville, Ky., and Arthur Wright, Upper Montclair, N. J.; said Lissauer, now by judicial change of name to Arthur Wilmer Lissauer No Drawing. Application January 27, 1939, Serial No. 253,118

4 Claims. (Cl. 127—55)

The general practice presently employed in refining cane sugar, for example, comprises: grinding the cane to extract the raw juice; defecating the extract, i. e. liming, heating and subsequently clarifying it by precipitating and removing the dark-brown cachaza mud; evaporating the defecated liquid to produce a cloudy syrup generally known as Melladura; and, after crystallization, passing the resulting massecuite through a centrifugal separator. The resulting products are a "yellow" or raw sugar, which may be used with or without the customary recrystallization and the activated carbon or "whitening" treatment, and a dark cloudy molasses which requires extensive additional treatment.

The defecation of the extract has the effect of dissolving some of the colloid proteins and thus reducing them to a form which renders subsequent operations leading to their final removal extremely difficult. After defecation, a considerable amount of suspended and dissolved matter remains in the liquid. As a result, some of it is deposited upon the walls of the evaporator tubes reducing the capacity of the evaporator and regularly necessitating its discontinuance and dismantling for cleaning purposes. The rest of the suspended and dissolved materials remains in the Melladura and has the effect first, of reducing the initial yield of crystalline sugar, and second, of requiring the molasses to be further refined, involving repeated crystallization, etc., in order to remove more and more of its organic-matter content and thus make possible the recovery of more and more of its crystalline sugar content.

The principal object of the present invention is to effect a preliminary treatment of the extract, prior to its defecation, to the end of removing substantially all of its organic-matter content, including much of the dissolved and colloid proteins, and thereby prevent or at least reduce, in substantial measure, all of the difficulties and limitations occasioned by the presence of such matter.

The cachaza mud entrains an appreciable amount of defecated liquid; hence requires further treatment, involving one or more filtering steps, to effect its recovery. This mud, however, is not highly filterable because it is composed of extremely fine particles which readily pass through a coarse filtration medium and rapidly clog a fine or dense medium. Because of this difficulty, considerable effort has been directed to the improvement of the filterable qualities of this precipitate. It has been discovered that finely ground bagasse, commonly called Bagacillo, is a filter-aid for cachaza mud. Accordingly, Bagacillo is screened and then mixed with the mud and the mixture filtered. Bagacillo greatly improves the filtering qualtity of the mud but, at the same time, retains much of its sucrose liquid content; hence necessitates additional washing to complete the recovery. It also adds materially to the cost of the treatment, especially when screened bagasse must be augmented with pulverized cane fibers.

Another important object is to effect the preliminary production of a highly filterable precipitate which readily yields its liquid content and is easily washed free of sucrose, which can be usefully re-employed in the refining process to lower the cost thereof, which not only decreases the subsequent yield of cachaza mud but also changes its nature and color, and which, when mixed and filtered with cachaza mud, will retain the mud while releasing its liquid content.

The invention resides in the discovery that the addition, to the extract, of bentonite, dispersed in water, reacts with the solids of the suspension, including the nitrogen-bearing organic materials in the extract, such as the jellied proteins which are partly in suspension and partly in solution, to effect a coagulation of sponge-like character. This coagulation enmeshes the organic materials suspended in the extract to form a dark precipitate which, instead of gravitating in the extract, floats to the top thereof, as do the scums when heating raw juice. The dark precipitate contains substantially all of the dissolved proteins, the colloid proteins, and other colloidal suspensions which are chiefly organic; hence leaves the extract in a clarified condition substantially free of the troublesome organic matters. As a consequence, when the clarified extract is further treated in the normal way by defecation and evaporation, a highly refined Melladura is produced having a clarity which depends largely upon the concentration of the more easily removable mineral salts.

The effectiveness of the bentonite treatment is manifested: 1st by the remarkable clearness of the clarified extract; 2nd by the absence of dissolved and colloid proteins in the defecated liquid; 3rd by the substantially white granular character of the cachaza mud, after neutralization with lime, which is now composed largely of precipitated lime salts; 4th by the substantial reduction of deposits in the evaporator tubes; 5th by the clarity and light color of the Melladura; 6th by the substantial increase not only in the yield of crystalline sugar during the initial crystallization but in the brightness of such sugar; and 7th in the improved quality, clarity, light color and lowered viscosity of the molasses.

Further advantages of this treatment result from the production of the dark precipitate. This mass, due apparently to its sponge-like nature, is highly filterable, readily yields its liquid content, and is easily washed free of sucrose. It may be re-used to take advantage of its bentonite content and thus correspondingly reduce the refining cost. Its preliminary removal from the extract decreases the amount of cachaza mud and changes the nature and color of such mud. Finally, it greatly improves the filterable quality of the mud, when mixed with it, without losing its readiness to yield its sucrose-bearing liquid content.

The bentonite used in this treatment is a colloidal clay, the particles of which are believed to be in the form of thin flat plates having an enormous surface area in relation to their mass. These particles, when suspended in water, have several characteristics. First, because of their small size, they exhibit a remarkable freedom of motion or mobility. Second, they carry strong negative-electric charges (anions) scattered over their extensive surfaces. Third, they evidence a remarkable ability to adsorb from 6 to 7 times their weight in water, and, in doing so, expand or swell 10 to 15 times their dry volume, this latter action being apparently due to their property of holding the adsorbed water in the form of an envelope surrounding each particle and moving with it. When dispersed in water, they repel each other, and, therefore, remain separated and evenly distributed throughout the water so long as they remain charged.

On the other hand, when they combine with positively charged particles of nitrogen-bearing or similar organic material, their charges are neutralized and coagulation ensues. Manifestly, there are many colloidal clays of this general character. They can be recognized by their ability to form electro-negative suspended sols or gels when mixed with water. Such clays are generally termed and herein designated "true bentonite" to distinguish from other clays lacking such properties. A "true bentonite" highly suitable for the treatment herein specified is described in U. S. Patent No. 2,036,617 and is presently marketed as "K. W. K. Volclay."

In using "true bentonite" in accordance with this invention, it is highly desirable, if not absolutely necessary, to disperse it in water before adding it to the extract. Eminently satisfactory results can be obtained from a 5% to 10% "true bentonite suspension" that is to say, one having 5% to 10%, by weight, of "true bentonite" and 95% to 90%, by weight, of water.

While the application of the proposed treatment to the prevailing practice of manufacturing cane sugar is fairly evident from the foregoing, it may be helpful to summarize the important steps of a suitable method employing this invention. Accordingly, the raw cane juice, herein termed "extract" or "raw extract," is derived from the cane in the usual way. An amount of a "true bentonite suspension," prepared as before stated, is added to the extract sufficient to provide a weight ratio of "true bentonite" to the mixture as a whole ranging from 0.05% to 0.5% (1/20 to 1/2 of 1%). This novel mixture is heated in accordance with customary "sugarhouse" practice to a temperature ranging from 170° F. to 208° F. depending upon the character of the extract. The coagulation and ensuing precipitation takes place fairly rapidly. As soon as it is completed, the clarified extract may be withdrawn and processed in the usual manner, as by defecation and evaporation, to produce a Melladura of novel character in that it is substantially free of the nitrogen-bearing dissolved and colloid proteins and all other troublesome organic colloids.

A desired portion or all of the dark precipitate, resulting from the bentonite treatment, may be added to the next batch of extract to secure the reuse of its bentonite content and, at the same time, recover its sucrose-bearing liquid content. Otherwise, it may be filtered and washed in the usual way to recover the liquid separately, such liquid being thereafter added to either the raw or the clarified extract as desired.

The cachaza mud, resulting from the defecation by lime to neutrality or other desired pH, is substantially white instead of being dark brown as heretofore. It may be filtered and washed in the usual way to make the usual recoveries. On the other hand, it may be, and preferably is, added to and mixed with an amount of the dark precipitate sufficient to render it highly filterable, the mixture thereafter being filtered and washed in the customary manner.

The Melladura resulting from the evaporation is a highly refined syrup of unusual light color and clarity. Its clarity is dimmed to an extent depending upon the concentrations of its suspended or crystallized mineral salts, all of which, however, are relatively easy to remove by filtration. Its quality and purity is such as to permit its use as a table syrup. Upon initial crystallization, it yields a substantially larger percentage of its crystalline sugar content than has been heretofore obtainable. In addition, the sugar crystals are substantially white and brilliant, whereas, in the prevailing process, they are yellow and dull and require further treatment to whiten and brighten them. Needless to say, the molasses initially produced from the Melladura is of light color and of high quality.

The present treatment substantially eliminates the difficulties encountered in the refinement of extract obtained from frozen cane generally and from the contrary canes, generally known as P. O. J. canes, which have been introduced because of their disease-resistant properties, high sucrose content and good percentage of fiber. The extract from either frozen cane or P. O. J. cane contains an unusually high quantity of deleterious organic materials which have heretofore noticeably lowered the sucrose output. The present invention, however, makes complete recovery possible by the ready removal of the deleterious materials.

While this invention has been explained in connection with the manufacture of cane sugar, it may be usefully employed in the production of sucrose generally and of beet sugar specifically. In producing the latter, sugar beets are sliced and the juice diffused to obtain the extract. At the present time, such extract, which contains organic materials in colloidal suspension, is limed. In accordance with this invention, it is treated with a "true bentonite suspension" before liming or defecation. Thus, in both cases, sucrose-bearing liquids generally and sucrose extract particularly, which, as derived from the base product, contain deleterious proteins and organic suspensions are treated with "true bentonite suspension"

to effect the removal of such deleterious matters.

The properties of "true bentonite" may be used to advantage by adding relatively small quantities of it to the cachaza muds obtained in the standard practice of sugar manufacture as a result of the defecation step. A quantity of such muds sufficient, when filtered, to form a cake less than 1/8" thick is capable of forming a cake more than 3/16" thick when, for example, "true bentonite" is added in the proportion of 1 gram to 1 gallon of mud. It is understood, of course, that the bentonite will be dispersed in water before adding it to the mud. The bentonite-treated cake is more easily washed, dewatered and discharged. It reduces, and, for many plants, eliminates the need of adding Bagacillo to the muds.

Having described our invention, we claim:

1. A method of increasing the filtering qualities of cachaza mud derived from the defecation of raw sugar juice comprising: mixing true bentonite with the mud.

2. A method of increasing the filtering qualities of cachaza mud derived from the defecation of raw sugar juice comprising: mixing with the mud the dark precipitate derived from the coagulating treatment of undefecated raw sugar juice with a true bentonite suspension.

3. A method of recovering the sugar content of cachaza mud derived from the defecation of raw sugar juice comprising: mixing with the mud a precipitate derived from the coagulating treatment of undefecated raw sugar juice with a true bentonite suspension; and then filtering the mixture.

4. An improvement in the method of recovering sugar values from raw sugar juice by adding a true bentonite suspension to the raw juice to clarify it, separating the clarified juice from the ensuing dark precipitate and defecating the clarified juice comprising: separating the defecated juice from the ensuing cachaza mud precipitate; mixing the dark precipitate with the cachaza mud precipitate; and filtering and washing the mixture.

ADOLPH W. LISSAUER.
ARTHUR WRIGHT.